Dec. 8, 1964 F. KUGEL 3,160,116
SELF-PROPELLED VEHICLE, ESPECIALLY RAIL VEHICLE
Filed Jan. 11, 1961 2 Sheets-Sheet 1
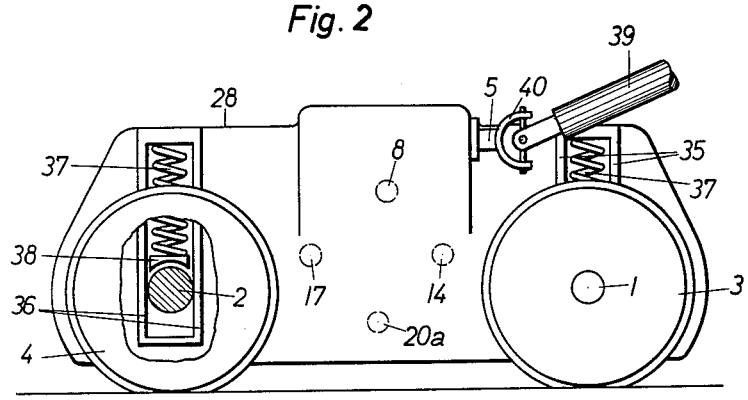
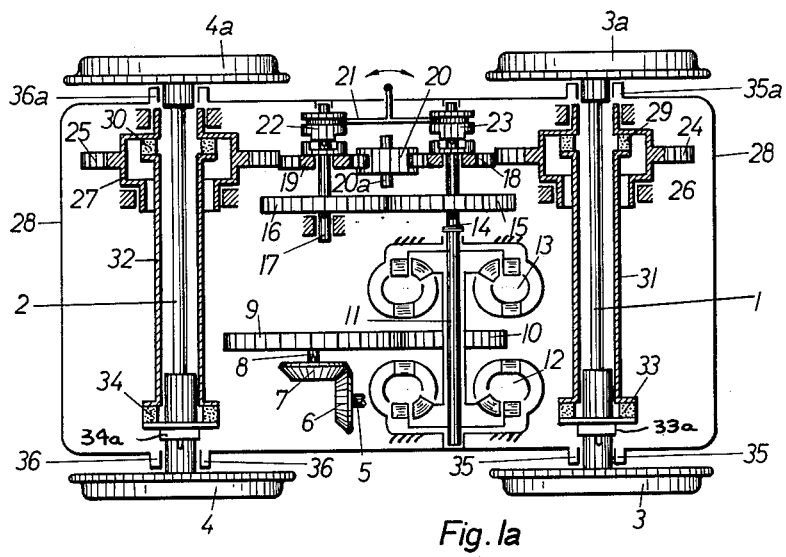
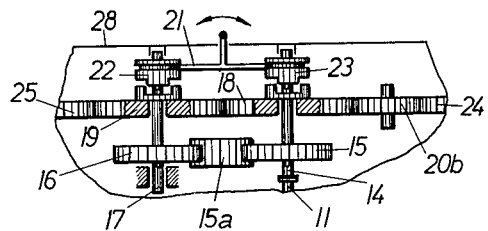
INVENTOR.
FRITZ KUGEL
BY Dec. 8, 1964 F. KUGEL 3,160,116
SELF-PROPELLED VEHICLE, ESPECIALLY RAIL VEHICLE
Filed Jan. 11, 1961 2 Sheets-Sheet 2

INVENTOR.
FRITZ KUGEL
BY

United States Patent Office 3,160,116
Patented Dec. 8, 1964

3,160,116
SELF-PROPELLED VEHICLE, ESPECIALLY
RAIL VEHICLE
Fritz Kugel, Heidenheim (Brenz), Germany, assignor to
J. M. Voith G.m.b.H., Heidenheim (Brenz), Germany
Filed Jan. 11, 1961, Ser. No. 81,987
Claims priority, application Germany Jan. 16, 1960
7 Claims. (Cl. 105—96.2)

The present invention relates to a self-propelled vehicle with a transmission interposed between two adjacent sets of driving wheels, especially a rail vehicle with integral combustion engine and fluid flow transmission. The invention is in particular directed to a self-propelled vehicle of the just mentioned type, in which two sets of driving wheels are driven by a variable drive ratio transmission interposed therebetween.

It is an object of the present invention to design the above mentioned transmission such that transmissions of high output, and including hydraulic power transmitting elements may conveniently be arranged in the truck or bogie of the vehicle or between adjacent driving axles while the axles may be maintained fairly close together and while a minimum of the mass of the parts is unsprung.

It is another object of this invention so to design the transmission in connection with a vehicle of the above mentioned type that, if desired, spur gears only, and only a small number thereof, may be used which spur gears will be able to transmit high forces.

It is still another object of this invention so to design two adjacent driving wheels of a self-propelled vehicle that a direct connection of axle drives or fluid flow circuits to the driving axles will be avoided.

These and other objects and advantages of the invention will appear more clearly from the following specification in connection with the accompanying drawings, in which:

FIG. 1 diagrammatically illustrates a horizontal section through a truck of a self-propelled rail vehicle with a transmission according to the invention.

FIG. 1a shows a transmission arrangement somewhat modified over that of FIG. 1.

FIG. 2 illustrates on a larger scale than FIG. 1 a side view of the transmission shown in FIG. 1.

Figure 3:
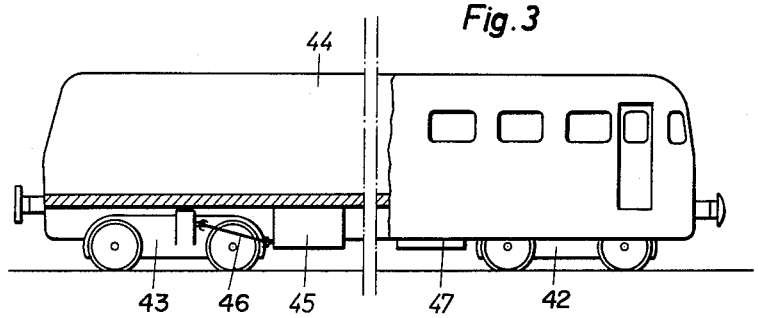

FIG. 3 diagrammatically illustrates a self-propelled rail vehicle with two trucks.

Figure 4:
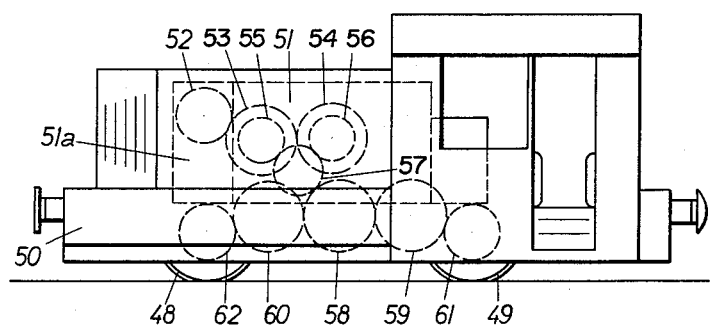

FIG. 4 is a diagrammatic illustration of a self-propelled rail vehicle with two driving axles mounted in a rigid frame.

In conformity with the present invention, the transmission interposed between two adjacent sets of driving wheels is combined with two adjacent parallel axle drives to form a rigid unit. This transmission unit is cushioned, or sprung, relative to the driving axles, and the output shaft of said transmission and all shafts subsequent thereto are arranged parallel to the driving axles. Furthermore, the said output shaft is arranged non-coaxially with regard to the driving axles. Such an arrangement makes it possible to mount transmissions of high output and also hydraulic transmissions, especially such with a plurality of fluid flow circuits, in the truck of the vehicle and, particularly, between two adjacent fairly closely spaced driving axles, and while only a minimum of parts are unsprung or are non-cushioned. This arrangement also permits the employment of spur gears only, which will be able to transmit high forces. In this way, it will not be necessary to provide bevel gears subsequently (when looking in the direction of the power flow) to the transmission parts for bringing about the variable transmission ratio. This is an important advantage inasmuch as the transmissible torques of such bevel gears and the dimensions thereof are limited when the bevel gears are arranged on the driving axles. If the output from the vehicle motor is effected in longitudinal direction of the vehicle, it is however, advantageous at the input side into the transmission unit to provide bevel gears. This, however, is no drawback inasmuch as at this point there is sufficient space for a bevel gear transmission. Moreover, at this place, if desired, the transmission of the required high amount of power through bevel gears may be obtained by increasing the speed of the gears while simultaneously reducing the torques to be transmitted thereby.

If the transmission unit comprises hydraulic elements having fluid flow circuits for the various velocity ranges, such elements are advantageously arranged so that their axes are parallel to the driving axles. When employing a hydrostatic transmission, there exists the possibility, with the already mentioned longitudinal location of the vehicle motor, to avoid a bevel gear transmission at the transmission output shaft by arranging the driving shaft of the hydrostatic pump in longitudinal direction with regard to the vehicle and to couple said input shaft directly with the motor, or through the intervention of a Cardan transmission or by means of spur gears while arranging the hydrostatic motor with its output shaft parallel to the driving axles.

The arrangement of the transmission according to the present invention furthermore makes it possible to avoid the direct mounting of axle drives or hydraulic elements having fluid flow circuits on the driving axles. In this way the driving axles are less subjected to stress, and a sufficient cushioning of the transmission parts will be obtainable in a relatively simple manner.

According to a further development of the invention, the tranmission unit of a self-propelled rail vehicle is so arranged that the housing of said transmission unit simultaneously forms the frame of the truck or a part of the main frame of the rail vehicle. Such an arrangement considerably reduces weight and costs. When employing a vehicle with a reversible spur gear transmission, the present invention, for purposes of obtaining a forward and rearward drive, comprises a shaft which, through spur gears, is in continuous driving connection with the output shaft of the transmission parts bringing about the variable transmission ratio. In this connection both the said shaft and also the output shaft have each loosely rotatably mounted thereon a further spur gear. These spur gears (loose wheels) are so designed that they are adapted by means of a jaw clutch or the like each selectively to be coupled to the respective shafts pertaining thereto. According to a further modification of the invention, the said two loose wheels are operatively connected through an intermediate gear which latter establishes the output drive to the driving axles. Thus, with this arrangement both driving axles may simultaneously be driven and selectively at forward drive or at rearward drive as well as rearward drive.

According to another embodiment to the invention, the two shafts pertaining to the loose wheels have about the same spacing from the ground, or, with a rail vehicle, same spacing from the rails. The output to each of the two driving axles is effected from the loose wheel adjacent the respective driving axle. This arrangement is particularly advantageous because the two loose wheels are already located close to the respective driving axles and no further or, at most, only a few spur gears are required for establishing the connection to the driving axles. Depending on whether or not the above mentioned intermediate gear is available, the drive of the driving axles for forward and rearward movement is effected together or one driving axle only drives the vehicle when moving forward whereas the other driving axle drives the vehicle only when the latter is intended to move backwards.

Inasmuch as the transmission unit due to the cushioning with regard to the driving axles is displaced vertically, the drive of the driving axle from the transmission unit is to be effected in a special way. In conformity with the invention it is suggested that for driving each driving axle, a spur gear is connected to a hollow shaft which is relatively short with regard to the length of the driving axles and which partially surrounds the driving axle near one driving wheel. Furthermore, this hollow shaft is journalled in a transmission unit and through a Cardan hollow shaft is drivingly connected to the driving axle, while the Cardan or universal joint on the output side is located near the other driving wheel. A further development of this arrangement consists in that the joint located on the input side and pertaining to the Cardan hollow shaft is arranged in the interior of the spur gear. In view of the fact that the spur gear mounted on the short hollow shaft is adjacent to a driving wheel, and since the output universal joint is now located within the driving gear, the Cardan hollow shaft can be designed as long as possible. This has a favorable effect on the uniform speed transmission to the driving axles because with a long Cardan shaft the angular change at the universal joint is kept to a minimum.

Referring now to the drawings in detail, and FIGS. 1 and 2 thereof in particular, the truck illustrated therein comprises two driving axles 1 and 2 and the sets of drive wheels 3, 3a and 4, 4a. A first train of meshing gears interconnects the axles. The drive from the motor (not shown) is effected through a Cardan shaft 39 to a shaft 5 and from here through a pair of bevel gears 6, 7 to a shaft 8 and finally through a step-up spur gear transmission 9, 10 to a primary shaft 11 designed as a hollow shaft. The primary shaft 11 has connected thereto the primary parts or impellers of two parallelly arranged fluid torque converters 12, 13. The secondary parts or runners of said converters 12, 13 are drivingly connected to a central secondary or output shaft 14. The connectors are fluid flow power transmitting elements connected between input shaft 11 and output shaft 14. The converters 12, 13 are respectively equipped with different blading and are adapted to be filled selectively so as to be selectively effective for establishing a fluid flow power path from shaft 11 to shaft 14. In this way, two velocity ranges are realized for shaft 14 for any speed of shaft 11.

The central secondary shaft 14 which is the output shaft from the fluid flow power transmitting means, simultaneously forms the input shaft for the reversing gear and has keyed thereto a spur gear 15 which meshes with a spur gear 16 mounted on a counter shaft 17 substantially parallel to the secondary shaft 14. Gears 15 and 16 form a second gear train of continuously meshing gears that drivingly interconnect output shaft 14 and auxiliary shaft 17. In addition thereto, a loose wheel 18 is mounted on said secondary shaft 14. A further loose wheel 19 is mounted on shaft 17. The two loose wheels 18 and 19 are drivingly connected to each other through an intermediate gear 20 which is mounted on a shaft 20a. The arrangement furthermore comprises jaw clutches 22, 23 adapted selectively to be actuated by a clutch lever 21 in order to connect either the spur gear 18 or the spur gear 19 with shaft 14 or 17 respectively for making the forward or rearward drive effective. The spur gears 18, 19 are furthermore in mesh with spur gears 24 and 25 respectively which gears 24 and 25 are keyed to short hollow shafts 26 and 27 respectively. Gears 18, 19, 20, 24 and 25 form the aforementioned first train of gears continuously in mesh and drivingly interconnected axles 1 and 2 for rotation in the same direction. These hollow shafts which surround the driving axles, as well as all shafts of the transmission as mentioned so far are stationarily journalled in a housing 28 which forms the frame of the truck. The hollow shafts 26, 27 are connected to hollow Cardan shafts 31, 32 by means of Cardan or universal joints 29, 30. The joints 33, 34 on the output side of said Cardan shafts 31, 32 are drivingly connected through intermediate members 33a, 34a to the driving axles 1, 2 and thereby to the driving wheels 3, 4. The driving axles 1, 2 and the intermediate members 33a, 34a are displaceable in vertically extending guiding means 35, 35a and 36, 36a respectively. The guiding means 35, 36 are shown in side view in FIG. 2. The drive wheel 4, however, has not been shown in FIG. 2 in order to make the intermediate member 34a visible which latter is adapted to slide in guiding means 36. The housing 28 rests through the intervention of a spring 37 (FIG. 2) and supporting member 38 on drivingly axle 2. These springs 37 cushion the variable speed transmission with regard to the driving axles so that the non-cushioned mass is reduced to a minimum.

In the arrangement according FIG. 1a the intermediate gear 20 illustrated in FIG. 1 is deleted. The two loose wheels 18, 19 are in mesh with each other. In order to retain the same sense of rotation for the driving axles, a spur gear 20b is arranged between loose wheel 18 and spur gear 24, while spur gear 25 is driven by spur gear 19 as shown in FIG. 1. The jaw clutches 22, 23 actuated by clutch lever 21 connect as shown in FIG. 1 the two loose wheels 18, 19 with their respective shaft 14 or 17. To obtain reverse operation of the vehicle, an intermediate gear 15a is positioned between gears 15 and 16. This gear 15a is necessary because of the elimination of the intermediate gear 20 of FIGURE 1. It will be apparent that gear 20 of FIGURE 1 and gear 15a of FIGURE 2 perform the same function; namely, that of providing for two directions of rotation of the first gear train and, therefore, the axles, depending upon which of couplings 22, 23 is engaged.

The arrangement of two trucks 42, 43 with transmissions designed in conformity with FIGS. 1 and 2, is shown in FIG. 3 in connection with a self-propelled rail vehicle 44. In this arrangement, a motor 45 drives the driving wheels of truck 43 through a Cardan shaft 46 and a transmission. A further motor 47 serves for driving the driving wheels of the other truck 42.

FIG. 4 illustrates a rail vehicle in which two sets of drive wheels 48, 49 are resiliently journalled in the rigid vehicle frame 50 and in which the housing of the transmission unit forms a part of the vehicle frame. A motor 51 and stepped transmission 51a following said motor 51 convey driving power to a spur gear 53 through a spur gear 52, said spur gear 53 being in meshing engagement with a spur gear 54. Mounted on the shafts to which the spur gears 53, 54 are keyed, are loose wheels 55, 56 adapted selectively, for instance by a jaw clutch (not shown) to be coupled to the shafts pertaining thereto and to be drivingly interconnected through an intermediate gear 57. By selectively coupling the loose wheels 55, 56 to the respective shafts pertaining thereto, the forward and rearward drive respectively will be made effective. The drive of the two sets of drive wheels 48, 49 is effected from intermediate gear 57 through spur gears 58, 59, 60, 61 and 62. In addition to the advantage of being able to convey the driving force from the transmission through strong spur gears to the driving axles, this arrangement also makes it possible to bridge the distance between the axles by spur gears while avoiding coupling bars or a coupling linkage.

It is, of course, to be understood that the present invention is, by no means, limited to the particular constructions shown in the drawings but also comprises any modifications within the scope of the appended claims.

What I claim is:

1. In a self-propelled vehicle which comprises two spaced parallel driving axles with two driving wheels each: a transmission frame, means resiliently supporting said frame on said axles, an input shaft adapted for connection to a prime mover and extending into the frame, an output shaft in the frame in parallel spaced relation to said axles, at least one fluid flow power transmitting element in the frame connected between said input shaft and said output shaft, an auxiliary shaft in the frame in parallel spaced relation to said output shaft and said axles, a first gear train in the frame comprising continuously meshing gears and extending from one axle to the other and drivingly interconnecting said axles for rotation in the same direction, said first gear train including a gear respectively rotatably mounted on each of said output and auxiliary shafts; coupling means on said output and auxiliary shafts operable for selectively coupling one only of said gears to their respective shafts, and a second gear train in the frame comprising continuously meshing gears and extending from said output shaft to said auxiliary shaft and drivingly interconnecting said output and auxiliary shafts, said second gear train including a gear fixed to each of said output and auxiliary shafts, one of said gear trains including an intermediate gear between and meshing with the said gears of said one of said trains on said output and auxiliary shafts whereby when either of said couplings is operated to couple the gear pertaining thereto to its respective shaft, the gear pertaining to the other coupling will rotate in a direction opposite to the direction of rotation of its respective shaft thereby to provide for two directions of rotation of said first gear train.

2. In a self-propelled vehicle which comprises two spaced parallel driving axles with two driving wheels each: a frame resiliently supported on said axles, an input shaft adapted for connection to a prime mover and extending into the frame, an output shaft in the frame in parallel spaced relation to said axles, at least one fluid flow power transmitting element in the frame connected between said input shaft and said output shaft, an auxiliary shaft in the frame in parallel spaced relation to said output shaft and said axles, a first train of continuously meshing gears in the frame drivingly interconnecting the axles for rotation in the same direction and comprising a first gear drivingly connected to each axle and also comprising two gears respectively rotatably mounted on said output and auxiliary shafts, coupling means on said output and auxiliary shafts operable for selectively coupling either one only at a time of said two gears to their respective shafts, a second train of continuously meshing gears in the frame drivingly interconnecting said output and auxiliary shafts and comprising two other gears respectively fixed to said output and auxiliary shafts, the said two gears of one of said gear trains meshing with each other and the said two gears of the other of said gear trains being spaced apart, and an intermediate idler gear in said other of said gear trains between and meshing with the said two spaced apart gears thereof whereby when either of said couplings is operated to couple the pertaining rotatable gear to its respective shaft, the rotatable gear on the other shaft will rotate in a direction opposite to the direction of rotation of said other shaft, said first train of gears being located in a plane perpendicular to said axles and near one end of the axles.

3. The arrangement according to claim 2, wherein each said first gear is journalled in the frame near said one end of the pertaining axles and the driving connection from each said first gear to its pertaining axle comprises a hollow shaft surrounding the axle in radially spaced relation thereto and extending from said first gear to near the other end of the axle, and universal drive joints connecting opposite ends of the hollow shaft with said first gear and said axle respectively.

4. The arrangement according to claim 3 wherein the universal drive joint connecting each first gear to its hollow shaft is located in the plane of said first gear and within the said first gear.

5. The arrangement according to claim 3 wherein said flexible drive joint connecting each first gear to its hollow shaft is located in the plane of said first gear, said fluid flow power transmitting element and said output and auxiliary shafts and all of the gears of said gear trains except first gears being located between said axles.

6. In a self-propelled vehicle which comprises two spaced parallel driving axles with two driving wheels each: a transmission frame, means resiliently supporting said frame on said axles, an input shaft adapted for connection to a prime mover and extending into the frame, an output shaft in the frame in parallel spaced relation to said axles, at least one fluid flow power transmitting element in the frame connected between said input shaft and said output shaft, an auxiliary shaft in the frame in parallel spaced relation to said output shaft and said axles, a first gear train in the frame comprising continuously meshing gears and extending from one axle to the other and drivingly interconnecting said axles for rotation in the same direction, a second gear train in the frame including a gear respectively rotatably mounted on each of said output and auxiliary shafts; coupling means on said output and auxiliary shafts operable for selectively coupling one only of said gears to their respective shafts, an intermediate gear in said second gear train between and meshing with the said two gears of said second gear train, and a third train in the frame comprising continuously meshing gears and extending from said output shaft to said auxiliary shaft and drivingly interconnecting said output and auxiliary shafts for rotation in opposite directions, said third gear train including a gear fixed to each of said output and auxiliary shafts, said intermediate gear being drivingly connected to one of the gears of said first gear train, whereby when either of said couplings is operated to couple the gear pertaining thereto to its respective shaft, the gear pertaining to the other coupling will rotate in a direction opposite to the direction of rotation of its respective shaft thereby to provide for two directions of rotation of said first gear train.

7. In a self-propelled vehicle which comprises two spaced parallel driving axles with two driving wheels each: a transmission frame, means resiliently supporting said frame on said axles, an input shaft adapted for connection to a prime mover and extending into the frame, an output shaft in the frame in parallel spaced relation to said axles, at least one fluid flow power transmitting element in the frame connected between said input shaft and said output shaft, an auxiliary shaft in the frame in parallel spaced relation to said output shaft and said axles, first gear means in the frame comprising continuously meshing gears and including a train of gears extending from one of said axles to other of said axles and thus interconnecting said axles for rotation in the same direction, said first gear means including a gear respectively rotatably mounted on each of said output and auxiliary shafts; coupling means on said output and auxiliary shafts operable for selectively coupling one only of the said gears on the shafts to their respective shafts, and second gear means in the frame comprising continuously meshing gears and extending from said output shaft to said auxiliary shaft and drivingly interconnecting said output and auxiliary shafts, said second gear means including a gear fixed to each of said output and auxiliary shafts, one of said first gear means and said second gear means including an intermediate gear between and meshing with the said gears of said first gear means and said second gear means on said output and auxiliary shafts whereby when either of said couplings is operated to couple the gear pertaining thereto to its respective shaft, the gear pertaining to the other coupling will rotate in a direction opposite to the direction of rotation of its respective shaft thereby to provide for two directions of rotation of said gear train means and, therefore, of said axles.

References Cited in the file of this patent

UNITED STATES PATENTS

| | | |
|---|---|---|
| 2,290,643 | Kjolseth | July 21, 1942 |
| 2,717,523 | Lammerz | Sept. 13, 1955 |
| 2,744,421 | Lammerz | May 8, 1956 |
| 2,839,011 | Kugel | June 17, 1958 |
| 2,910,013 | Murphy | Oct. 27, 1959 |

FOREIGN PATENTS

| | | |
|---|---|---|
| 660,186 | Germany | May 18, 1938 |
| 1,157,510 | France | Dec. 30, 1957 |